(12) United States Patent
Abe et al.

(10) Patent No.: US 6,184,925 B1
(45) Date of Patent: *Feb. 6, 2001

(54) LENS HAVING COLOR CORRECTION DATA

(75) Inventors: Nobuaki Abe; Sachio Hasushita, both of Hokkaido (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/826,372

(22) Filed: Apr. 9, 1997

(30) Foreign Application Priority Data

Apr. 11, 1996 (JP) .................................................. 8-089578

(51) Int. Cl.[7] ............................. H04N 9/73; H04N 9/093; H04N 5/225
(52) U.S. Cl. .......................... 348/223; 348/360; 348/263
(58) Field of Search .................................... 348/222, 223, 348/360, 361; 382/167

(56) References Cited

U.S. PATENT DOCUMENTS

| | | | |
|---|---|---|---|
| 4,959,728 | * 9/1990 | Takahashi et al. | 348/360 |
| 5,087,978 | * 2/1992 | Hieda | 348/360 |
| 5,132,825 | * 7/1992 | Miyadera . | |
| 5,182,591 | * 1/1993 | Kawaaski et al. . | |
| 5,583,397 | * 12/1996 | Ogawa . | |
| 5,668,596 | * 9/1997 | Vogel | 348/222 |
| 5,805,213 | * 9/1998 | Spaulding et al. | 348/222 |

* cited by examiner

Primary Examiner—Tuan Ho
Assistant Examiner—Luong Nguyen
(74) Attorney, Agent, or Firm—Greenblum & Bernstein, P.L.C.

(57) ABSTRACT

A lens having color correction data includes a memory in which the color correction data necessary to make the color of an image of an object to be recorded, formed by the lens, coincident with the color of the object perceived through the naked eye is stored.

12 Claims, 5 Drawing Sheets

LENS HAVING COLOR CORRECTION DATA

BACKGROUND OF THE INVENTION

1. Field of the Invention

The present invention relates to a photographing lens having data on colors of light before and after light passes through the photographing lens or a similar lens.

2. Description of the Related Art

In recent image recording technologies, an image can be recorded as a digital image signal. In a digital image recording system, it is important to reproduce the same color as the color perceived through the human eye on a display, a printing sheet, and the like, and the degree of significance of accurate color rendering in digital reproduction is increasing. There are various recording means for digital images. For example, an image picked up by an image pick-up device such as a CCD may be converted to an electrical image signal and recorded as a magnetic signal on a magnetic tape, or other medium, may be displayed on a display, may be printed on paper using a color printer, or may be copied. In any of these implementations, an optical image formed through a lens is converted to an analog or digital image signal, and is retrieved from the pick-up device and stored.

A photographing lens is not completely transparent or achromatic, and lens materials have an inherent color (inherent spectral transmittance) which varies in accordance with any applied coating (see FIG. 2). Consequently, the color perceived by the human eye through the photographing lens is different from the color directly perceived by the human eye (without looking through the photographing lens). Consequently, when the image formed by the photographing lens is converted and reproduced using an image signal, it is necessary to correct the image signal in order to obtain the same color as that directly perceived by the human eye without looking through the photographing lens (which will be referred to as the true color).

However, in the prior art in which an image of an object formed by the photographing lens is converted to image signals and recorded on a recording medium, no color data is available to show the change in color depending on the photographing lens. Consequently, in a known solution to correct the color, the digital image signal recorded on the recording medium is read therefrom and is indicated on a display, and the displayed image is directly compared with the object to be recorded or printed.

It is an object of the present invention to enhance the degree of coincidence of color between a manuscript and recorded image data, and to facilitate the correction of the color, by providing necessary data (to make colors before and after recording identical) to a photographing lens when the color image is recorded through an optical element such as the photographing lens.

SUMMARY OF THE INVENTION

To achieve the object mentioned above, according to the present invention, there is provided a lens having color correction data, comprising a storage means for storing the color correction data necessary to make the color of an image of an object to be recorded, formed by the lens, coincident with the color of the object perceived through the naked eye.

The color correction data can be spectral transmittance data of the lens, chromaticity coordinates of red, green, blue and white of the lens, or a deviation from a reference value.

The lens can be a photographing lens such as that used on a digital still camera, a TV camera and the like.

Another concept of the present invention, there is provided a digital camera including a camera body and a photographing lens detachably attached to said camera body. The photographing lens having a storage means for storing the color correction data necessary to make the color of an image of an object to be recorded, formed by the photographing lens, coincident with the color of the object perceived through the naked eye. The camera body having an image pickup device for converting the image formed by the photographing lens to digital image data; a recording device for recording the digital image data on a recording medium; and a controller which writes the color correction data read from the storage means of said photographing lens in the recording medium, together with the digital image data.

The present disclosure relates to subject matter contained in Japanese Patent Application No. 08-89578 (filed on Apr. 11, 1996) and which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
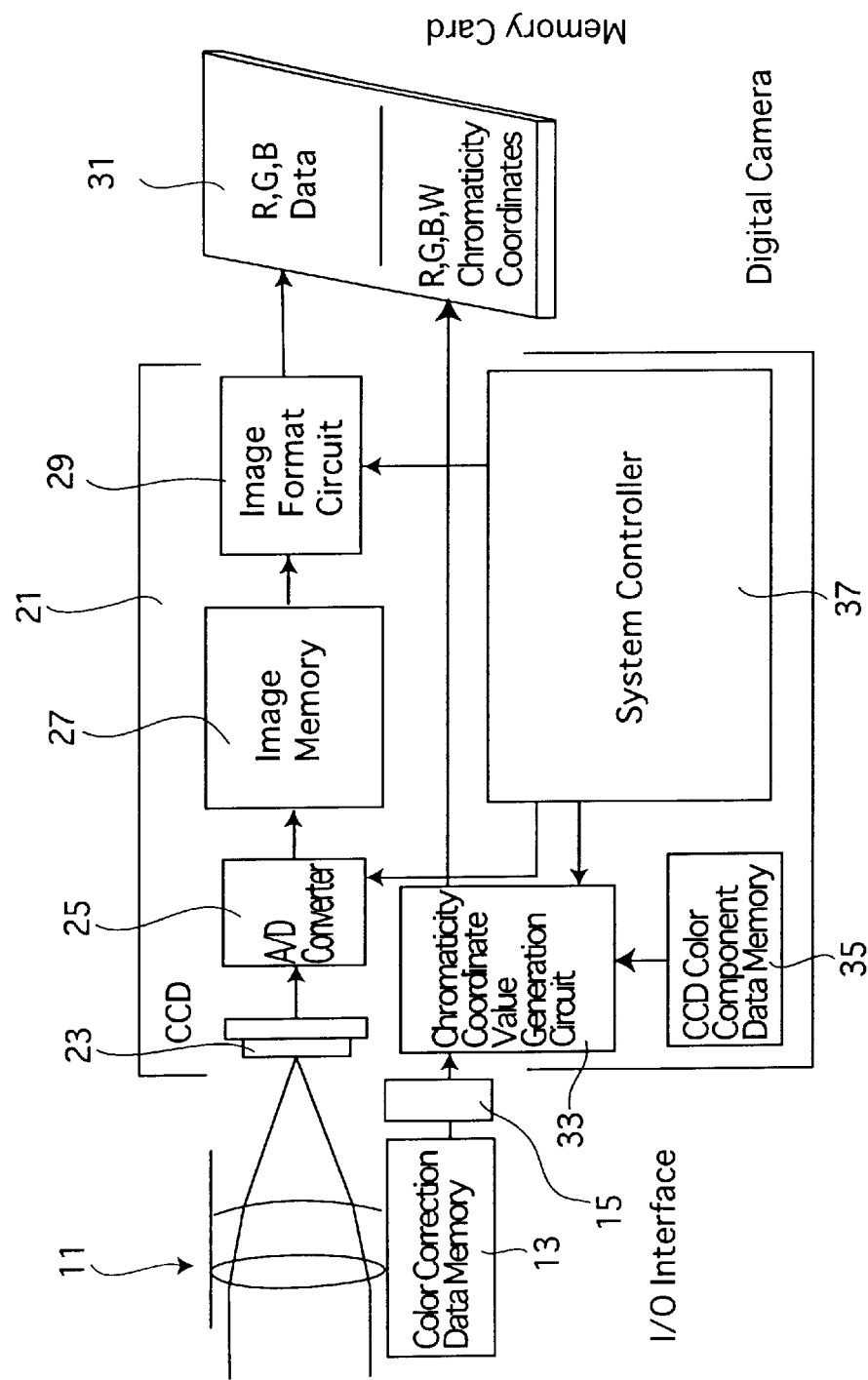
FIG. 1 is a block diagram of circuitry in a digital still camera to which the present invention is applied.
Figure 2:
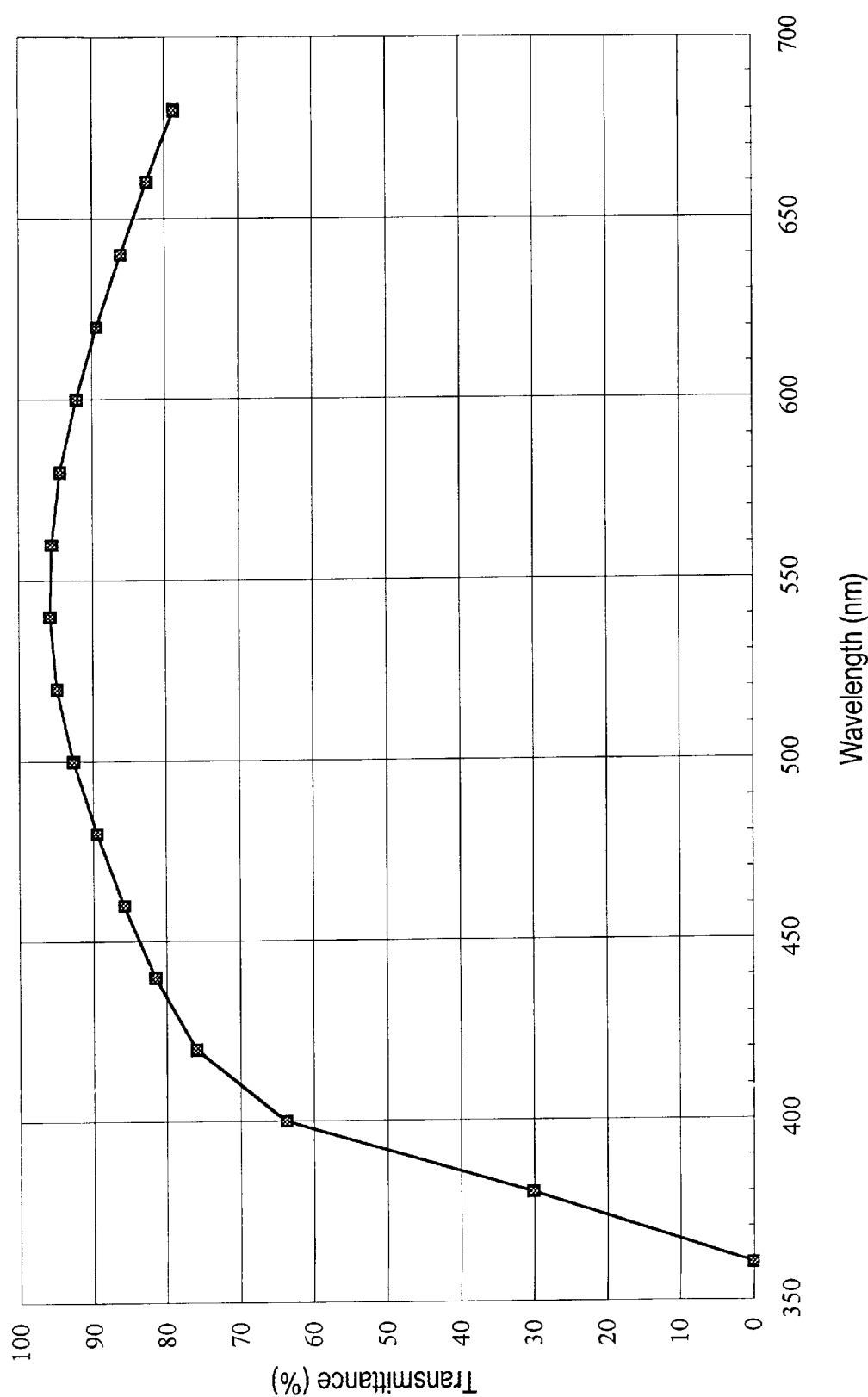
FIG. 2 is a graph which shows spectral transmittance of a photographing lens.

FIG. 1 shows a block diagram of circuitry of a digital still camera, using a photographing lens to which the present invention is applied. The digital camera includes a camera body 21 and a photographing lens 11, which is detachably attached to the camera body 21. The photographing lens 11 is provided with a color correction data memory 13 which stores therein color correction data that is used when the photographing operation is carried out using the photographing lens 11.

The color correction data includes data necessary to correct the color of the object image formed by the photographing lens 11 to be coincident with the color of the object image formed by an ideal (achromatic or transparent) photographing lens. For instance, the color of the object image is divided into three primaries RGB (red, green, blue), and is converted to values of CIE chromaticity coordinates. RGBW chromaticity coordinate correction values necessary to make the lens-altered color of the object (viewed through the photographing lens 11) coincident with the true color of the object (viewed with the naked eye) define color correction data which is stored in the color correction data memory 13. The color correction data stored in the color correction data memory 13 is output to the camera body 21 through an input/output (I/O) interface 15.

The object image is formed on a light receiving surface of a CCD (image pickup device) 23 by the photographing lens 11. The CCD 23 is provided with a large number of pixels which are regularly located in a matrix arrangement. Each pixel is composed of three photoelectric transducers which are sensitive to the three primaries of R, G, and B, respectively. Upon photographing, the CCD 23 integrates the color components of the object image using the photoelectric transducers, and outputs the integral values as RGB color signals.

Figure 3:
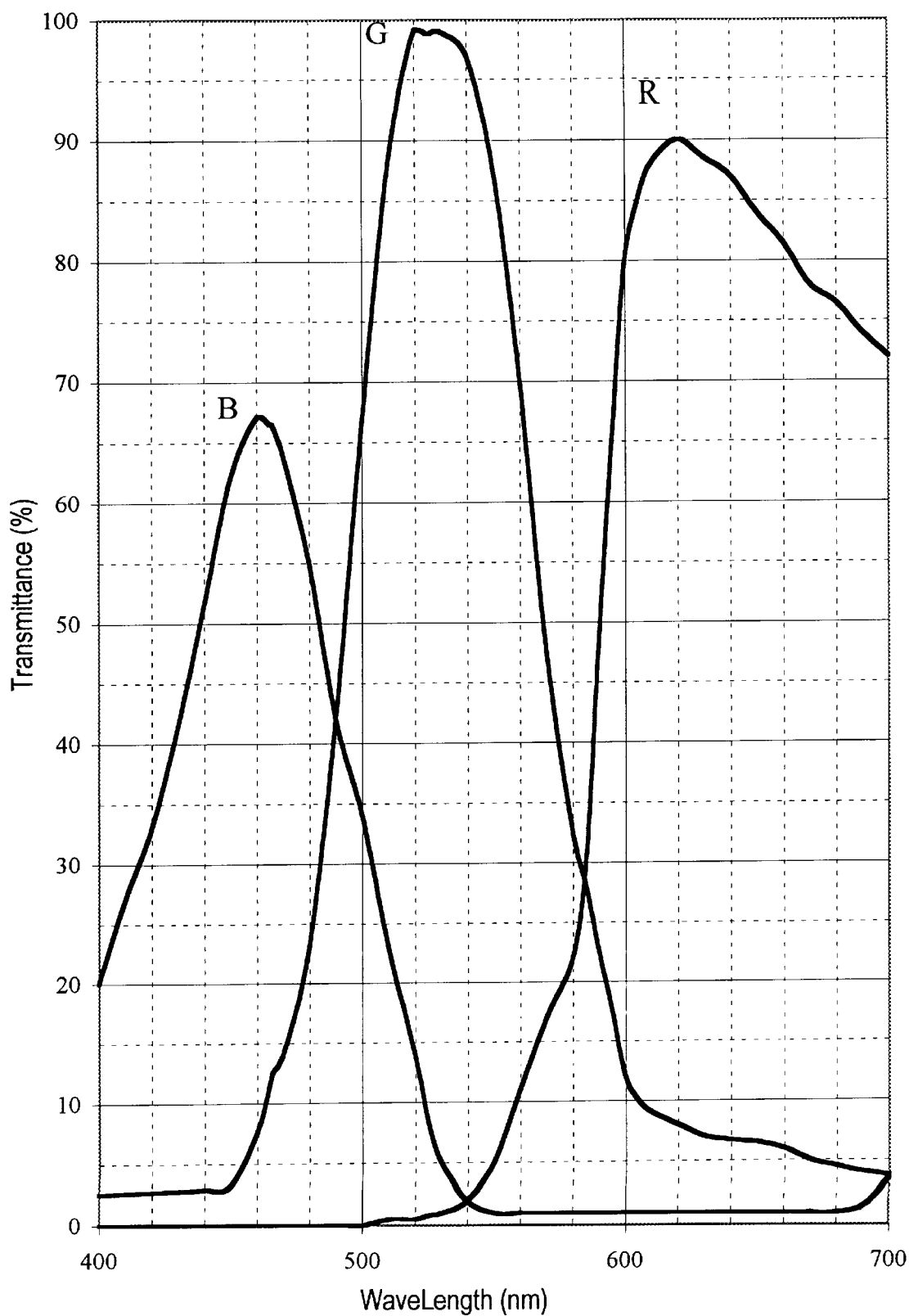
FIG. 3 is a graph which shows spectral transmittance of RGB filters of a CCD (image pickup device)

The CCD 23 usually has a spectral sensitivity distribution. If the CCD 23 has RGB filters, the spectral transmittances of the RGB filters are, for example, as shown in FIG. 3. The values of the chromaticity coordinates of R, G, B (in the case of the CCD 23 having the R, G, B filters) are measured and stored in advance in accordance with the outputs of the R, G, B pixels of the CCD 23. This procedure simplifies the subsequent calculations. In the illustrated embodiment, the values of the R, G, B chromaticity coordinates and the values of the W chromaticity coordinates are written in the CCD color component data memory 35 as spectral sensitivity data of the R, G, B pixels of the CCD 23. It should be noted that if the values of the chromaticity coordinates of the photographing lens 11 or the variation of the values of the chromaticity coordinates by the photographing lens 11 are stored in the color correction data memory 13, it is possible to store the values of the R, G, B, W chromaticity coordinates only in the CCD color component data memory 35.

The analog color signals of R, G, and B output from the CCD 23 are converted to digital signals (of, for example, 8 bits) by an A/D converter 25, and are successively written in the image memory 27. When the writing of the R, G, B color signals for one line (one field or one frame) is completed, the stored data is successively read from the image memory 27 and is converted to a predetermined image format (for example, "TIFF"-Tag Image File Format) by an image format circuit 29. The converted data is stored in the memory card 31 as the R, G, B color signals. The memory card 31 can be a flash memory, SRAM, or other memory means.

The R, G, B chromaticity coordinate values stored in the color correction data memory 13 are fetched by the chromaticity coordinate value generation circuit 33 of the camera body 21 through the I/O interface 15. The chromaticity coordinate value generation circuit 33 fetches the R, G, B, W chromaticity coordinate values of the CCD 23 from the CCD color component data memory 35, and calculates the R, G, B, and W chromaticity coordinate values of the image pickup system of the digital camera in accordance with the R, G, B, W chromaticity coordinate values of the CCD 23. Thereafter, the R, G and B color signals output from the CCD 23 are converted to digital values. These digital values, and the R, G, B, W chromaticity coordinate values of the image pickup system, are written in the card memory 31.

In general, each time the image data of each frame or field is recorded, the R, G, B, W chromaticity coordinate values corresponding thereto are recorded. Alternatively, it is also possible to record the R, G, B, W chromaticity coordinate values when the memory card 31 is mounted to the digital camera 21, or it is possible to record one color correction data set when the first image data is recorded.

The operations of the CCD 23, the A/D converter circuit 25, the image memory 27, the image format circuit 29, the memory card 31, and the chromaticity coordinate value generation circuit 33 are controlled by a system controller 37.

To process the stored image data, the memory card 31 is detached from the camera body 21 and is mounted to an image reader of an image processor (not shown). The image processor reads the RGB image data and the R, G, B, W chromaticity coordinate data from the memory card 31 and corrects the RGB image data. Thus, images of the same color as the true color (i.e., the color of the object viewed with the naked eye) can be produced.

In a digital still camera according to the present invention, when an image of a sheet of manuscript or a three-dimensional object as an object to be recorded or photographed is picked up by the CCD 23 and converted to digital image data, the chromaticity coordinate data of the three primaries R, G, B based on the CIE chromaticity diagram and the chromaticity coordinate value of white (W) are used as final color correction data.

If a silver halide film, in which data can be recorded on a magnetic recording layer of the film, is used (as in the "APS"-Advanced Photo System which has been recently developed) the R, G, B, W chromaticity coordinate correction values which are recorded on the magnetic recording layer of the film can be fetched using a film scanner. The R, G, B, W chromaticity coordinate correction values can be read and used when converted to digital image data. Thus, true color can be obtained.

The color correction data and the calculation to obtain the the color correction data in the first embodiment mentioned above, applied to a digital still camera, will be discussed below in more detail.

The following discussion is, as an example, applied to one common format of digital image data, i.e., TIFF. It is assumed that the digital image data of a pixel (R, G, B pixels) of the CCD 23 is represented by P(r, g, b). "r", "g", "b" represent the luminance of red, green, and blue, respectively and are each converted to 256 gradients (8 bits) for so-called 24-bit "full color". Although no default of the chromaticity coordinate value of R, G, B is set, the chromaticity coordinate values of NTSC are used as defaults, since the chromaticity coordinate values of the NTSC (or PAL or SECAM) television standard are used in most cases. The chromaticity coordinate values of r, g, b of the defaults based on NTSC are as follows.

r (0.67, 0.33), g (0.21, 0.71), b (0.14, 0.08)

White (W) is a color of luminance P (255, 255, 255), but it is represented by W (0.310, 0.316) in accordance with the chromaticity coordinate. The light source having the characteristics corresponding to the chromaticity coordinate W (0.310, 0.316) is referred to as a C-light source.

Figure 5:
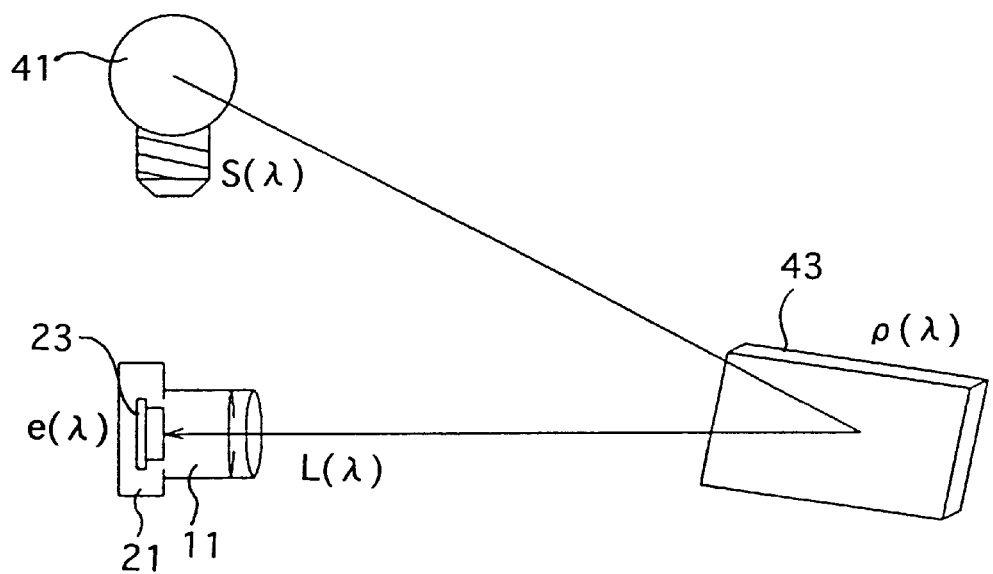

In the illustrated embodiment, the object 43 having a uniform spectral reflection factor $\rho(\lambda)$ is illuminated with light from the C-light source 41, so that an image of the object 43 formed by the photographing lens 11 is picked up by the CCD 23, as shown in FIG. 5. The chromaticity coordinates of the R, G, B pixel signals output from the CCD 23 are measured. The chromaticity coordinate correction data (e.g., difference) is obtained based on reference chromaticity coordinates (reference color data) and the measured chromaticity coordinates. The chromaticity coordinate correction data thus obtained and the reference chromaticity coordinates are written as color correction data in the CCD color component data memory 35. The chromaticity coordinate correction data includes color correction data of the image pickup system from the photographing lens 11 to the CCD 23. It is possible to obtain and store the chromaticity coordinate correction data for the photographing lens 11 and the CCD 23 in the respective memories 13 and 35, as mentioned above.

The R, G, B image data of the object image picked up by the photographing lens 11 and output from the CCD 23 is written in the memory card 31 together with the chromaticity coordinate correction data which has been read from the CCD color component data memory 35.

Moreover, the R, G, B image data of the object image picked up by the photographing lens 11 and output from the CCD 23 is corrected in accordance with the chromaticity coordinate correction data which has been read from the CCD color component data memory 35, and the corrected R, G, B image data is written in the memory card 31 together with the reference chromaticity coordinates.

The chromaticity coordinates are calculated as follows.

Figure 4:
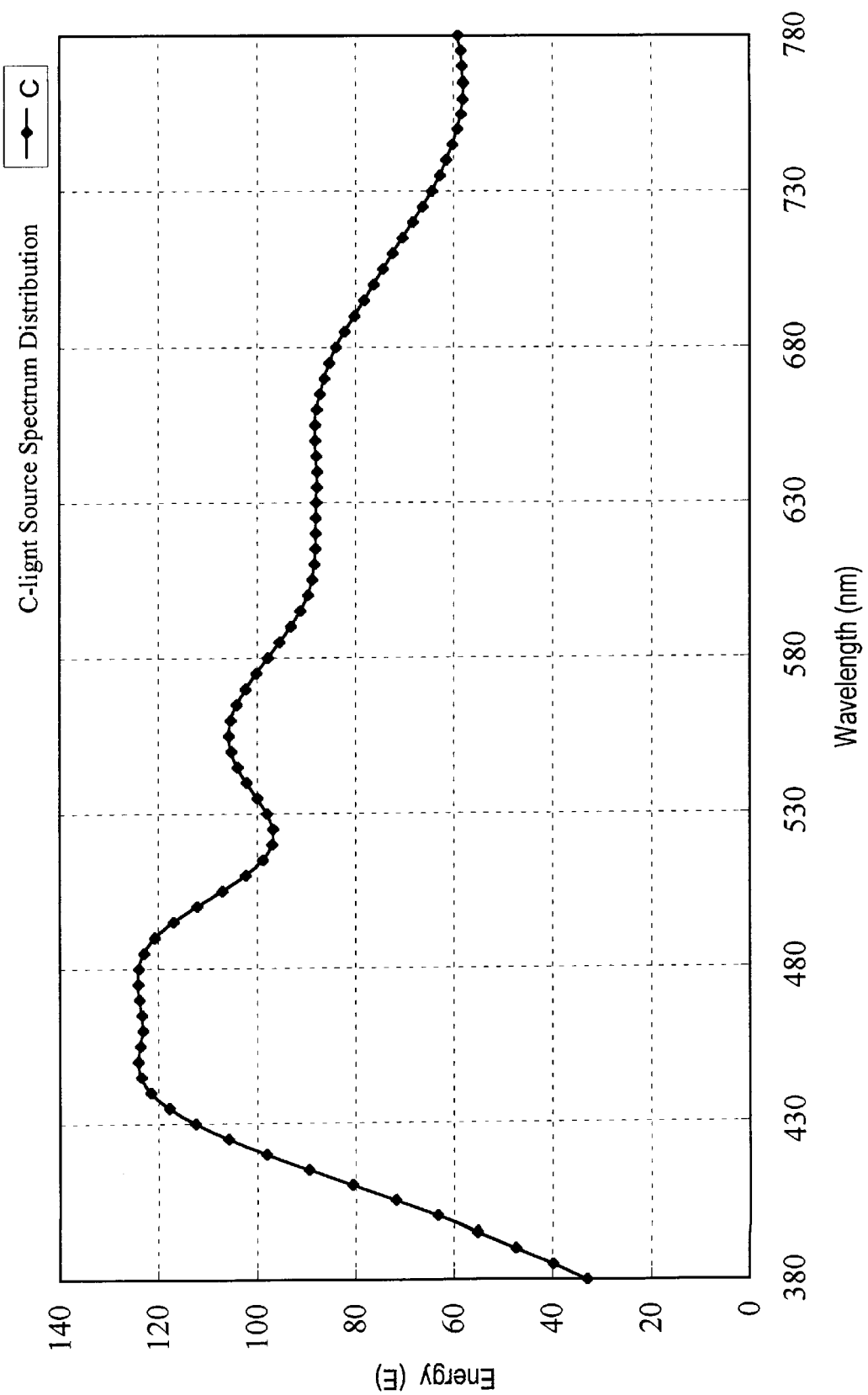
FIG. 4 is a graph which shows spectral power distribution of a C-light source; and, FIG. 5 is a schematic view to explain how to photograph an object which is illuminated with light from a C-light source, using a digital still camera, according to the present invention.

In the following discussion, it is assumed that the spectral power distribution of the C-light source 41 is $S(\lambda)$ wherein $\lambda$ represents the wavelength (mm) (see FIG. 4); the spectral reflection factor of the object 43 which is illuminated with light from the C-light source 41 is $\rho(\lambda)$; and the spectral transmittance of the photographing lens 11 is $L(\lambda)$. The spectral power distribution $W(\lambda)$ when the image of the object 43 illuminated with light from the C-light source 41 is picked up by the CCD 23 is given by:

$$W(\lambda)=S(\lambda)\cdot\rho(\lambda)\cdot e(\lambda)$$

Note that the object 43 has a uniform reflectance through the entire wavelength band.

Since the spectral sensitivity $e(\lambda)$ of R, G, B differ from each other, the spectral sensitivity $e(\lambda)$ is divided into $er(\lambda)$, $eg(\lambda)$, and $eb(\lambda)$, corresponding to R, G, and B, respectively. The values of $er(\lambda)$, $eg(\lambda)$, and $eb(\lambda)$ are integrated with the wave length, as follows.

$$R=\int S(\lambda)\cdot\rho(\lambda)\cdot er(\lambda)\, d\lambda$$

$$G=\int S(\lambda)\cdot\rho(\lambda)\cdot eg(\lambda)\, d\lambda$$

$$B=\int S(\lambda)\cdot\rho(\lambda)\cdot eb(\lambda)\, d\lambda$$

To obtain the integrated chromaticity coordinates of R, G, B, the coordinates are converted to the x-y-z coordinates, using spectral tristimulus values $\bar{x}(\lambda)$, $\bar{y}(\lambda)$, $\bar{z}(\lambda)$. Thus, the values of the coordinates X, Y, Z of R are given by:

$$Xr=\int R(\lambda)\cdot\bar{x}(\lambda)\, d\lambda$$

$$Yr=\int R(\lambda)\cdot\bar{y}(\lambda)\, d\lambda$$

$$Zr=\int R(\lambda)\cdot\bar{z}(\lambda)\, d\lambda$$

wherein the spectral power distribution $R(\lambda)$ of R is given by:

$$R(\lambda)=S(\lambda)\cdot\rho(\lambda)\cdot er(\lambda) \qquad 1\text{-}1$$

Similarly, the spectral power distributions $G(\lambda)$, $B(\lambda)$ of G and B are obtained as follows.

$$G(\lambda)=S(\lambda)\cdot\rho(\lambda)\cdot eg(\lambda) \qquad 1\text{-}2$$

$$B(\lambda)=S(\lambda)\cdot\rho(\lambda)\cdot eb(\lambda) \qquad 1\text{-}3$$

From the equations 1-1 through 1-3 which represent the spectral power distributions of R, G, B, the chromaticity coordinates x, y, z of R, G, B are obtained as follows.

$$xr=Xr/(Xr+Yr+Zr) \qquad 1\text{-}4$$

$$yr=Yr/(Xr+Yr+Zr) \qquad 1\text{-}5$$

$$xg=Xg/(Xg+Yg+Zg) \qquad 1\text{-}6$$

$$yg=Yg/(Xg+Yg+Zg) \qquad 1\text{-}7$$

$$xb=Xb/(Xb+Yb+Zb) \qquad 1\text{-}8$$

$$yb=Yb/(Xb+Yb+Zb) \qquad 1\text{-}9$$

The color W (white) is a combination of R, G, B multiplied by constant correction coefficients R', G', B' which are adjusted to be identical to the chromaticity coordinates of the C-light source 41. The chromaticity coordinates XW, YW, ZW of the color W are given as follows.

$$Xw = \int ((R'R(\lambda) + G'G(\lambda) + B'B(\lambda))*\bar{x}(\lambda))d\lambda \qquad 1\text{-}10$$
$$= R'Xr + G'Xg + B'Xb$$

$$Yw=R'Yr+G'Yg+B'Yb \qquad 1\text{-}11$$

$$Zw=R'Zr+G'Zg+B'Zb \qquad 1\text{-}12$$

Consequently, xw and yw can be obtained as follows.

$$xw=Xw/(Xw+Yw+Zw)=0.310 \qquad 1\text{-}13$$

$$yw=Yw/(Xw+Yw+Zw)=0.316 \qquad 1\text{-}14$$

The true color can be reproduced by controlling the gain of the R, G, B color signals of the CCD 23, using the correction coefficients R', G', B' which satisfy the formulae 1-13 and 1-14.

The above discussion has been applied to an ideal (theoretical) photographing lens. Namely, no spectral transmittance $L(\lambda)$ of the actual photographing lens 11 has been taken into account. The formulae 1-1 through 1-12 are replaced with the following formulae 2-1 through 2-12 when the spectral transmittance $L(\lambda)$ of the actual photographing lens 11 is considered, wherein the suffix "L" corresponds to the spectral transmittance $L(\lambda)$.

$$RL(\lambda)=S(\lambda)\cdot\rho(\lambda)\cdot L(\lambda)\cdot er(\lambda) \qquad 2\text{-}1$$

$$GL(\lambda)=S(\lambda)\cdot\rho(\lambda)\cdot L(\lambda)\cdot eg(\lambda) \qquad 2\text{-}2$$

$$BL(\lambda)=S(\lambda)\cdot\rho(\lambda)\cdot L(\lambda)\cdot eb(\lambda) \qquad 2\text{-}3$$

$$xrL=XrL/(XrL+YrL+ZrL) \qquad 2\text{-}4$$

$$yrL=YrL/(XrL+YrL+ZrL) \qquad 2\text{-}5$$

$$xgL=XgL/(XgL+YgL+ZgL) \qquad 2\text{-}6$$

$$ygL=YgL/(XgL+YgL+ZgL) \qquad 2\text{-}7$$

$$xbL=XbL/(XbL+YbL+ZbL) \qquad 2\text{-}8$$

$$ybL=YbL/(XbL+YbL+ZbL) \qquad 2\text{-}9$$

$$XwL=R'XrL+G'XgL+B'XbL) \quad 2\text{-}10$$

$$YwL=R'YrL+G'YgL+B'YbL \qquad 2\text{-}11$$

$$ZwL=R'ZrL+G'ZgL+B'ZbL \qquad 2\text{-}12$$

Consequently, xwL and ywL can be obtained as follows.

$$xwL = XwL/(XwL+YwL+ZwL) \quad 2\text{-}13$$

$$ywL = YwL/(XwL+YwL+ZwL) \quad 2\text{-}14$$

Since the formulae 1-1 through 1-14 are inherent to the camera regardless of the photographing lens, for example, the formulae 1-1 through 1-13 are stored in the memory (CCD color component data memory 35) of the camera body 21. The spectral transmittance data $L(\lambda)$ at the respective wavelengths of R, G, B is stored in the memory (color correction data memory 13) of the photographing lens 11. Thus, the system controller performs the calculations of the formulae 1-1 through 1-14 and 2-1 through 2-14, based on the stored data.

On the assumption that the differences of the chromaticity coordinates between when the photographing lens 11 is attached and no photographing lens 11 is attached are $\Delta x$ and $\Delta y$, the difference of the chromaticity coordinates of R, G, B, W can be obtained from the formulae 1-14 through 1-9, 1-13, 1-14, 2-4 through 2-9, 2-13 and 2-14, as follows.

$$\Delta xr = XrL/(XrL+YrL+ZrL) - Xr/(Xr+Yr+Zr)$$

$$\Delta yr = YrL/(XrL+YrL+ZrL) - Yr/(Xr+Yr+Zr)$$

$$\Delta xg = XgL/(XgL+YgL+ZgL) - Xg/(Xg+Yg+Zg)$$

$$\Delta yg = YgL/(XgL+YgL+ZgL) - Yg/(Xg+Yg+Zg)$$

$$\Delta xb = XbL/(XbL+YbL+ZbL) - Xb/(Xb+Yb+Zb)$$

$$\Delta yb = YbL/(XbL+YbL+ZbL) - Yb/(Xb+Yb+Zb)$$

$$\Delta xw = XwL/(XwL+YwL+ZwL) - Xw/(Xw+Yw+Zw)$$

$$\Delta yw = YwL/(XwL+YwL+ZwL) - Yw/(Xw+Yw+Zw)$$

Since these values depend on the spectral transmittance $e(\lambda)$ of the CCD 23, if the spectral transmittance $e(\lambda)$ of each CCD is measured and stored in the memory of the camera body, the color can be appropriately corrected in each camera. Moreover, if the spectral transmittance $e(\lambda)$ of each CCD 23 is substantially identical, it is possible to use the same spectral transmittance $e(\lambda)$, i.e., to store the same in the memory of the camera body.

As can be seen from the foregoing, in the illustrated embodiment, in case of the TIFF type, the chromaticity coordinates of the photographing system and the digital image data (RGB image data) output from the image pickup device are written into the TIFF image file in the following two modes of operation.

In the first mode of operation, the values of the chromaticity coordinates of the image pickup system based on the chromaticity coordinates of R, G, B, W of the photographing lens 11 and the chromaticity coordinates of R, G, B, W of the camera body 21, and the R, G, B image data (R, G, B luminance data) which are picked up by the CCD 23 and converted to digital values are individually written in the memory card in the mode shown in Table 1. In this case, the R, G, B luminance data read from the memory card is corrected in accordance with the chromaticity coordinates read from the memory card to reproduce the "true color" in an image processing apparatus, such as a computer.

TABLE 1

| Chromatic correction data: of photographic system | R = (0.69, 0.35) B = (0.16, 0.10) | G = (0.20, 0.73) W = (0.320, 0.318) |
|---|---|---|
| R, G, B luminance data: with no correction | R G B G B ··· 100 027 014 ····· | |

In the second mode of operation, the R, G, B image data (R, G, B luminance data), which is obtained by converting, based on the reference chromaticity coordinates, the values of the chromaticity coordinates of the R, G, B image data (which are converted to digital values in the CCD 23 based on the values of the chromaticity coordinates of the image pickup system based on the chromaticity coordinates of R, G, B, W of the photographing lens 11 and the chromaticity coordinates of R, G, B, W of the camera body 21) and the chromaticity coordinates of the defaults by the C-light source are written in the memory card in the image format shown in Table 2, together with the reference chromaticity coordinates. In this case, the corrected R, G, B image data read from the memory card is converted in accordance with the reference chromaticity coordinates read from the memory card to reproduce the true color in an image processing apparatus, such as a computer.

TABLE 2

| Whole Chromatic correction data | R = (0.67, 0.33) B = (0.14, 0.08) | G = (0.21, 0.71) W = (0.310, 0.316) |
|---|---|---|
| Corrected R, G, B: image data | R G B R G B ·· 103 029 011 ····· | |

As can be understood from the above discussion, in the illustrated embodiment, since the data on the color which is influenced by the photographing lens is stored in the photographing lens, the true color can be easily reproduced in accordance with the stored data.

Although the above discussion has been directed to the TIFF format, the present invention is not limited thereto and can be applied to any type of recording system.

According to the present invention, since the photographing lens is provided with a memory means for storing color correction data necessary to make the color of the object image formed by the photographing lens coincident with the color (true color) of the object perceived through the naked eye, the color correction data can be recorded when image signals of the object image formed by the photographing lens are recorded, or the image signals can be recorded after being corrected in accordance with the color correction data. Namely, the image signals whose color is identical to the true color can be recorded.

What is claimed is:

1. A digital camera having a camera body and a photographing lens detachably attached to said camera body,
   said photographing lens comprising:
      a memory medium that stores lens-characteristic color correction data characteristic of the photographing lens necessary to make the color of a lens-formed image of an object to be recorded, formed by the photographing lens, coincident with the color of the object as perceived by a naked human eye,
   and said camera body comprising:
      an image pickup device for converting the lens-formed image formed by said photographing lens to digital image data;
      an image pickup color component data memory including pick-up characteristic color component data characteristic of the image pickup device, a recording device for recording the digital image data on a recording medium; and a controller which writes the lens-characteristic color correction data characteristic of the photographing lens read from the memory medium of said photographing lens to said recording medium, together with said digital image data, said memory medium in said lens and said lens-characteristic color correction data therein being physically separate from said image pickup color component data memory in said camera body and said pick-up characteristic color component data therein.

2. A digital camera according to claim 1, said camera body further comprising a memory medium that stores color correction data used to correct the color of the digital image data based on reference color data.

3. A digital camera according to claim 2, wherein said controller writes the color correction data based on said color correction data read from said memory medium of said photographing lens and the color correction data read from the memory medium of the camera body in the recording medium, together with said digital image data.

4. A digital camera according to claim 3, said camera body further comprising a digital image converting device which converts the digital image data to data corresponding to said reference color data, in accordance with said color correction data read from said memory medium of said photographing lens and said color correction data read from said memory medium of said camera body.

5. A digital camera according to claim 2, wherein said controller writes the digital image data converted by the converting device and the reference color data in said recording medium.

6. A digital camera according to claim 4, wherein said reference color data and said color correction data are represented by chromaticity coordinates.

7. A photographing lens according to claim 1, wherein the color correction data is used to reproduce the color of the object as perceived through the naked human eye using light transmitted through said photographing lens.

8. A photographing lens according to claim 1, wherein said color correction data comprises spectral transmittance data of said photographing lens.

9. A photographing lens according to claim 1, wherein said color correction data comprises chromaticity coordinates of red, green, blue and white of said photographing lens.

10. A photographing lens according to claim 1, wherein said color correction data comprises a variation in chromaticity coordinates of red, green, blue and white of light transmitted through said photographing lens, caused when the light passes through said photographing lens.

11. A photographing lens according to claim 1, wherein said color correction data is associated with a difference between chromaticity coordinates of R (red), G (green), B (blue) and W (white) of the object perceived through the naked eye and chromaticity coordinates of R, G, B and W of the object image formed by said photographing lens.

12. A digital camera having a camera body and a photographing lens detachably attached to said camera body, in which the photographing lens comprises a lens-characteristic memory medium that stores lens-characteristic color correction data characteristic of the lens, necessary to make the color of a lens-formed image coincident with the color of the same image as perceived by a naked human eye, and an input/output interface for communicating with the camera body; and the camera body comprises an input/output interface for communicating with the photographing lens; an image pickup device for converting the lens-formed image formed by said photographing lens to digital image data; a pickup-characteristic memory medium that stores pickup-characteristic color correction data characteristic of the image pickup device, necessary to make the color of the digital image data coincident with the color of the same image as perceived by a naked human eye, a generating circuit for converting the color correction data of both said lens-characteristic memory medium and of said pickup-characteristic memory medium, and a controller which corrects said digital image data based on the converted color correction data of both said lens-characteristic memory medium and of said pickup-characteristic memory medium, said memory medium in said lens and said lens-characteristic color correction data therein being physically separate from said pickup-characteristic memory medium in said camera body and said pick-up characteristic color correction data therein.

* * * * *